(12) United States Patent
Park et al.

(10) Patent No.: US 10,581,101 B2
(45) Date of Patent: Mar. 3, 2020

(54) SOLID STATE HYDROGEN STORAGE DEVICE

(71) Applicant: HYUNDAI MOTOR COMPANY, Seoul (KR)

(72) Inventors: Sangbaek Park, Seoul (KR); Tae Won Lim, Seoul (KR); Dong Hoon Nam, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 368 days.

(21) Appl. No.: 15/359,060

(22) Filed: Nov. 22, 2016

(65) Prior Publication Data

US 2017/0244124 A1 Aug. 24, 2017

(30) Foreign Application Priority Data

Feb. 18, 2016 (KR) .................. 10-2016-0019052

(51) Int. Cl.

| | |
|---|---|
| *H01M 8/065* | (2016.01) |
| *H01M 8/04014* | (2016.01) |
| *H01M 8/04007* | (2016.01) |
| *H01M 8/2457* | (2016.01) |
| *B01D 19/00* | (2006.01) |
| *C01B 3/00* | (2006.01) |

(Continued)

(52) U.S. Cl.
CPC ............ *H01M 8/065* (2013.01); *B01D 19/00* (2013.01); *C01B 3/0031* (2013.01); *C01B 6/04* (2013.01); *C01B 6/243* (2013.01); *H01M 8/04007* (2013.01); *H01M 8/04014* (2013.01); *H01M 8/2457* (2016.02); *Y02E 60/324* (2013.01)

(58) Field of Classification Search
None
See application file for complete search history.

(56) References Cited

U.S. PATENT DOCUMENTS 6,368,735 B1 * 4/2002 Lomax ................. H01M 8/065
429/411
7,125,618 B2 10/2006 Kim
(Continued)

FOREIGN PATENT DOCUMENTS

| JP | 2002-222658 A | 8/2002 |
| JP | 2010-235443 A | 10/2010 |

(Continued)

OTHER PUBLICATIONS

Extended European Search Report issued in corresponding European Patent Application No. 162008833, dated Oct. 6, 2017.

(Continued)

*Primary Examiner* — Helen Oi K Conley
(74) *Attorney, Agent, or Firm* — Morgan, Lewis & Bockius LLP

(57) ABSTRACT

A solid-state hydrogen storage device includes a first storage for storing a reversible solid-state hydrogen storage material, a reactor disposed in the first storage to enable a hydrolysis reaction of a non-reversible solid-state hydrogen storage material to be performed therein, and a fuel cell stack, wherein the non-reversible solid-state hydrogen storage material is stored in the reactor, and wherein the non-reversible solid-state hydrogen storage material releases heat when the hydrolysis is performed.

11 Claims, 5 Drawing Sheets

(51) Int. Cl.
*C01B 6/04* (2006.01)
*C01B 6/24* (2006.01)

(56) References Cited

U.S. PATENT DOCUMENTS

| | | | |
|---|---|---|---|
| 7,285,142 | B1 | 10/2007 | Mohajeri et al. |
| 2002/0025462 | A1* | 2/2002 | Nakanishi ................. C01B 3/04 205/343 |
| 2003/0162059 | A1 | 8/2003 | Gelsey |
| 2004/0115493 | A1* | 6/2004 | Kim ...................... F17C 11/005 429/513 |
| 2005/0181245 | A1 | 8/2005 | Bonne et al. |
| 2008/0260630 | A1 | 10/2008 | Pez et al. |
| 2009/0155648 | A1 | 6/2009 | Lee et al. |
| 2009/0246575 | A1 | 10/2009 | Zhao et al. |
| 2010/0326992 | A1 | 12/2010 | De Rango et al. |
| 2012/0240455 | A1 | 9/2012 | Ku et al. |
| 2016/0327210 | A1 | 11/2016 | Chaise et al. |

FOREIGN PATENT DOCUMENTS

| | | |
|---|---|---|
| JP | 2011-508855 A | 3/2011 |
| KR | 10-0488726 B1 | 5/2005 |
| KR | 10-2010-0030103 A | 3/2010 |
| KR | 10-2011-0002913 A | 1/2011 |

OTHER PUBLICATIONS

European Search Report dated May 26, 2017, issued in European Patent Application No. 16200883.3.
Ned T. Stetson, Hydrogen Storage Overview- US DOE- 2012 Annual Merit Review and Peer Evalution Meeting, May 15, 2012.

* cited by examiner

SOLID STATE HYDROGEN STORAGE DEVICE

CROSS-REFERENCE TO RELATED APPLICATION

This application claims the benefit of priority to Korean Patent Application No. 10-2016-0019052, filed with the Korean Intellectual Property Office on Feb. 18, 2016, the entire contents of which are incorporated herein by reference.

TECHNICAL FIELD

The present disclosure relates to a solid-state hydrogen storage device.

BACKGROUND

Development of a system based on solid-state hydrogen storage materials has been actively undertaken in order to solve a current low volume storage density problem of a high-pressure gaseous hydrogen storage system.

However, a complex hydride based on a metal hydride, which is one type of the solid-state hydrogen storage materials, is reversible and has high storage capacity, but requires a high temperature environment of about 100° C. and continuous heat supply in order to release hydrogen. In other words, the metal hydride is excellent in reversibility of hydrogen release and storage reaction, but has a difficulty in practical usage because it is operated at a high temperature and needs a continuous heat supply for the hydrogen release. Further, development of such a solid-state hydrogen storage system that is operated at a high temperature is ongoing.

A hydrogen combustion device may be mounted, or a heat exchanger may be installed, in the solid-state hydrogen storage system to improve the supply of heat thereto. In this case, the heat exchanger may heat a storage vessel by using battery power. However, these solutions lead to a reduction in fuel efficiency due to energy loss.

Studies on ameliorating the problem by changing heat-exchanging fins, or types, sizes, positions, and the like of tubes inside a vessel, or a loading method of a hydrogen storage material, have been undertaken. However, these solutions lead to a reduction in weight storage capacity due to an increase in system weight.

Accordingly, improvements in minimizing the amount of heat needed to operate the solid-state hydrogen system and improving the weight storage capacity are required.

SUMMARY

The present disclosure has been made in an effort to provide a solid-state hydrogen storage device having advantages of being capable of improving heat efficiency and weight storage efficiency.

An exemplary embodiment of the present disclosure provides a solid-state hydrogen storage device that may include: a first storage for storing a reversible solid-state hydrogen storage material; a reactor disposed in the first storage to enable a hydrolysis reaction of a non-reversible solid-state hydrogen storage material to be performed therein; and a fuel cell stack, wherein the non-reversible solid-state hydrogen storage material is stored in the reactor.

The non-reversible solid-state hydrogen storage material may serve to release heat when the hydrolysis is performed.

The non-reversible solid-state hydrogen storage material may be $M^1BH_4$, $M^2(BH_4)_2$, $M^3(BH_4)_3$, $AlH_3$, $NH_3BH_3$, $NH_4B_3H_8$, $NH_2B_2H_5$, $NaBP_2H_8$, or a combination thereof, where $M^1$ may indicate Li, Na, or K, $M^2$ may indicate Mg or Ca, and $M^3$ may indicate Al or Ti.

The non-reversible solid-state hydrogen storage material may be $NaBH_4$, $NH_3BH_3$, or a combination thereof.

The reversible solid-state hydrogen storage material may be $M^4AlH_4$, $M^5(AlH_4)$ $M^6NH_2$, $M^7(NH_2)_2$, $Li_2NH$, MgNH, lithium-magnesium amide, lithium-magnesium imide, $M^8H$, $M^9H_2$, a Ti—Cr—V alloy, TiFe, Pd-$M^{10}$, Li-$M^{11}$, a Mg—Co alloy, a La—Ni alloy, or a combination thereof.

$M^4$ may indicate Li, Na, or Al, $M^5$ may indicate Mg, or Ca, $M^6$ may indicate Li or Na, $M^7$ may indicate Mg or Ca, $M^8$ may indicate Li, Na, K, Rb, or Cs, $M^9$ may indicate Mg, Ca, Sc, Ti, or V, may indicate Ba, Y, or La, and $M^{11}$ may indicate Ti, V, Zr, Nb, or Hf.

The reversible solid-state hydrogen storage material may be $NaAlH_4$ or a complex material containing $Mg(NH_2)_2$ and LiH.

A content of the non-reversible solid-state hydrogen storage material may be in a range of 0 wt % to 33.2 wt % with respect to a total of 100 wt % of the reversible solid-state hydrogen storage material and the non-reversible solid-state hydrogen storage material.

The solid-state hydrogen storage device may further include a water supply pipe having a first side connected to the reactor and a second side connected to the fuel cell stack, to supply water to the reactor.

An exemplary embodiment of the present disclosure provides a solid-state hydrogen storage device that may include: a first storage for storing a reversible solid-state hydrogen storage material; a reactor disposed in the first storage to enable a hydrolysis reaction of a non-reversible solid-state hydrogen storage material to be performed therein; a fuel cell stack; and a second storage unit for storing the non-reversible solid-state hydrogen storage material therein and connected to the reactor.

The second storage unit may include: a first unit-storage unit for storing the non-reversible solid-state hydrogen storage material; and a second unit-storage unit for storing an oxide generated after the hydrolysis reaction of the non-reversible solid-state hydrogen storage material.

Each of the first unit-storage unit and the second unit-storage unit may include two or more first unit-storage units.

Each of the first unit-storage unit and the second unit-storage unit may be individually replaced.

The solid-state hydrogen storage device may further include a first supply pipe having a first side connected to each of the first unit-storage units and a second side connected to the reactor, to supply the non-reversible solid-state hydrogen storage material to the reactor.

The solid-state hydrogen storage device may further include a second supply pipe having a first side connected to the first supply pipe and a second side having the fuel cell stack to supply water to the first supply pipe.

The solid-state hydrogen storage device may further include a gas/solution separator connected to the reactor to separate hydrogen gas and an oxide generated in the hydrolysis reaction of the non-reversible solid-state hydrogen storage material included in the reactor.

The solid-state hydrogen storage device may further include a third supply pipe having a first side connected to the reactor and a second side connected to the gas/solution separator to supply the hydrogen gas and the oxide generated in the hydrolysis reaction of the non-reversible solid-state hydrogen storage material included in the reactor to the gas/solution separator.

The solid-state hydrogen storage device may further include a fourth supply pipe having a first side connected to the gas/solution separator and a second side connected to the second unit-storage unit, to supply the oxide from the gas/solution separator to the second unit-storage unit.

The non-reversible solid-state hydrogen storage material may serve to release heat when the hydrolysis is performed.

The non-reversible solid-state hydrogen storage material may be $M^1BH_4$, $M^2(BH_4)_2$, $M^3(BH_4)_3$, $AlH_3$, $NH_3BH_3$, $NH_4B_3H_8$, $NH_2B_2H_5$, $NaBP_2H_8$, or a combination thereof, where $M^1$ may indicate Li, Na, or K, $M^2$ may indicate Mg or Ca, and $M^3$ may indicate Al or Ti.

The non-reversible solid-state hydrogen storage material may be $NaBH_4$, $NH_3BH_3$, or a combination thereof.

The reversible solid-state hydrogen storage material may be $M^4AlH_4$, $M^5(AlH_4)$ $M^6NH_2$, $M^7(NH_2)_2$, $Li_2NH$, $MgNH$, lithium-magnesium amide, lithium-magnesium imide, $M^8H$, $M^9H_2$, a Ti—Cr—V alloy, TiFe, Pd-$M^{10}$, Li-$M^{11}$, a Mg—Co alloy, a La—Ni alloy, or a combination thereof.

$M^4$ may indicate Li, Na, or Al, $M^5$ may indicate Mg or Ca, $M^6$ may indicate Li or Na, $M^7$ may indicate Mg or Ca, $M^8$ may indicate Li, Na, K, Rb, or Cs, $M^9$ may indicate Mg, Ca, Sc, Ti, or V, may indicate Ba, Y, or La, and $M^{11}$ may indicate Ti, V, Zr, Nb, or Hf.

The reversible solid-state hydrogen storage material may be $NaAlH_4$ or a complex material containing $Mg(NH_2)_2$ and LiH.

A content of the non-reversible solid-state hydrogen storage material may be in a range of 0 wt % to 33.2 wt % with respect to a total of 100 wt % of the reversible solid-state hydrogen storage material and the non-reversible solid-state hydrogen storage material.

The solid-state hydrogen storage device may further include a water supply pipe having a first side connected to the reactor and a second side connected to the fuel cell stack, to supply water to the reactor.

The solid-state hydrogen storage device may be for a vehicle.

According to an exemplary embodiment of the present disclosure, it is possible to provide a solid-state hydrogen storage device capable of improving heat efficiency and weight storage efficiency thereof.

According to another exemplary embodiment of the present disclosure, it is possible to provide a solid-state hydrogen storage device that is advantageous for vehicle loading.

DETAILED DESCRIPTION

Figure 1:
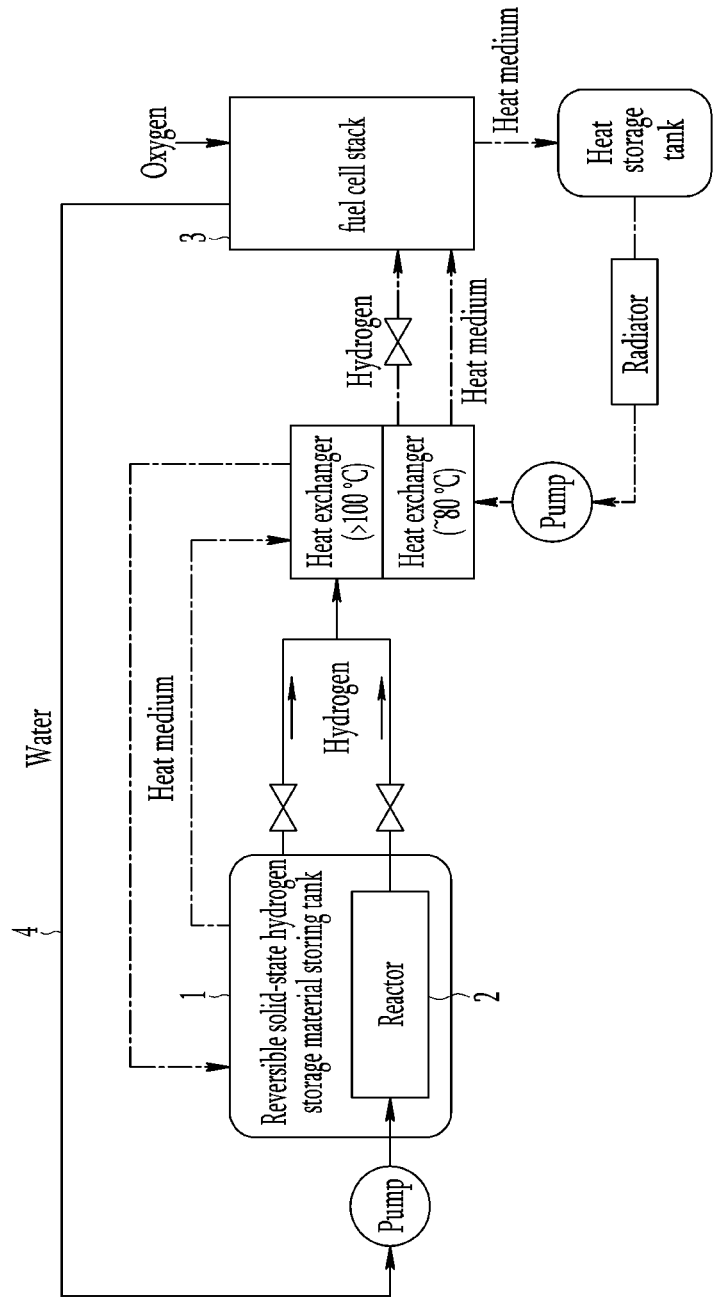
FIG. 1 is a schematic view illustrating a solid-state hydrogen storage device according to an exemplary embodiment of the present disclosure.

Hereinafter, exemplary embodiments of the present disclosure will be described in detail. However, the exemplary embodiments are illustrative only and are not to be construed to limit the present disclosure. The present disclosure is only defined by the scope of the claims as will be described below.

The drawings and description are to be regarded as illustrative in nature and not restrictive. Like reference numerals may designate like elements throughout the specification.

In addition, the size and thickness of each configuration shown in the drawings may be arbitrarily shown for better understanding and ease of description, but the present disclosure is not limited thereto.

In the drawings, the thickness of layers, films, panels, regions, etc., may be exaggerated for clarity. In the drawings, for better understanding and ease of description, the thickness of some layers and areas may be exaggerated. It will be understood that when an element such as a layer, film, region, or substrate is referred to as being "on" another element, it can be directly on the other element or intervening elements may also be present.

In addition, unless explicitly described to the contrary, the word "comprise" and variations such as "comprises" or "comprising" will be understood to imply the inclusion of stated elements but not the exclusion of any other elements. Further, in the specification, the word "on" means positioning on or below the object portion, but does not essentially mean positioning on the upper side of the object portion based on a gravity direction.

In this specification, weight storage efficiency may indicate a ratio of a weight of hydrogen included in a solid-state hydrogen storage material to a total weight of the solid-state hydrogen storage material and a storage unit.

Figure 2:
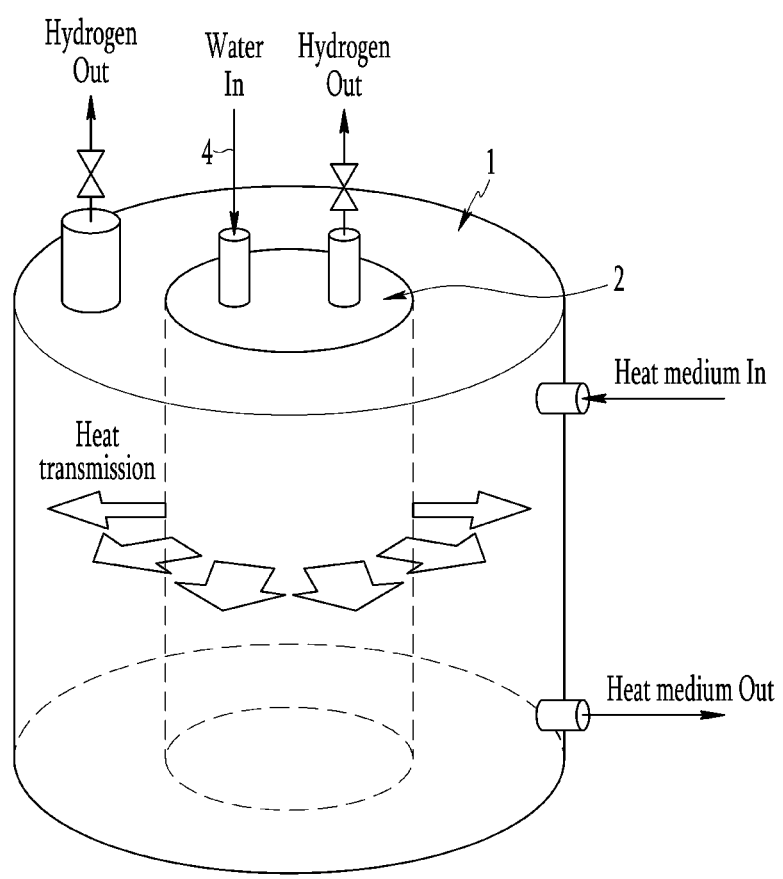
FIG. 2 is a schematic view illustrating a hydrogen storage unit in a solid-state hydrogen storage device according to an exemplary embodiment of the present disclosure.

FIG. 1 is a schematic view illustrating a solid-state hydrogen storage device according to an exemplary embodiment of the present disclosure. FIG. 2 is a schematic view illustrating a hydrogen storage unit in a solid-state hydrogen storage device according to an exemplary embodiment of the present disclosure. Hereinafter, the solid-state hydrogen storage device according to the exemplary embodiment of the present disclosure will be described with reference to FIG. 1 and FIG. 2.

In a present exemplary embodiment, the solid-state hydrogen storage device may include a first storage 1 configured to store a reversible solid-state hydrogen storage material, a reactor 2 disposed in the first storage 1 to enable a hydrolysis reaction of a non-reversible solid-state hydrogen storage material to be performed therein, and a fuel cell stack 3. In this case, the non-reversible solid-state hydrogen storage material is stored in the reactor 2. However, in the first storage 1 and the reactor 2, other materials may be stored in addition to the reversible solid-state hydrogen storage material and the non-reversible solid-state hydrogen storage material.

The non-reversible solid-state hydrogen storage material may serve to release heat when the hydrolysis process is performed.

As described above, a metal hydride which can be used as a hydrogen fuel source is excellent in reversibility of a hydrogen release and storage reaction. However, the metal hydride is operated at a high temperature of about 100° C. and needs a continuous heat supply for the hydrogen release.

In the solid-state hydrogen storage device according to a present exemplary embodiment, heat generated in the hydrolysis reaction of the non-reversible solid-state hydrogen storage material included in the reactor can be directly transferred to a storage unit configured to store a reversible hydrogen storage material. Accordingly, when a vehicle is initially started, the storage unit in which a metal hydride is stored can be quickly heated, thereby improving starting performance. Further, it is possible to reduce a quantity of heat consumption of a heat exchanger by using heat generated during the hydrolysis of the non-reversible hydrogen storage material, thereby improving heat efficiency.

In addition, since hydrogen gas generated in the hydrolysis of the non-reversible hydrogen storage material may be supplied to the fuel cell stack 3 to be used as a hydrogen fuel, a total weight storage efficiency of the hydrogen storage device may be improved. In general, the metal hydride that is used as a main hydrogen fuel source has a storage amount of about 2 wt % for the hydrogen with respect to a total weight of the alloy. However, the non-reversible hydrogen storage material may have a high content rate of about 5 wt %. Accordingly, it is possible to improve general hydrogen storage efficiency of the device by using the non-reversible hydrogen storage material having high weight storage efficiency.

In a present exemplary embodiment, the solid-state hydrogen storage device may further include a water supply pipe 4 configured to have a first side connected to the reactor 2 and a second side connected to the fuel cell stack 3, to supply water to the reactor 2.

It is possible to maximize the efficiency of the device by using a coolant or the like that circulates in the entire device as a water supply source for performing a hydrolysis reaction of a non-reversible hydride.

An operational sequence, including the hydrolysis reaction of the non-reversible hydride, will now be described. A catalyst for the hydrolysis as well as the non-reversible hydride may be stored in the reactor. In this case, they may be stored as a simple mixture or in a plurality of capsules. This is merely an example, and the present disclosure is not limited thereto. When water is supplied to the reactor through the water supply pipe, the hydrolysis reaction of the non-reversible hydride may occur, thereby releasing heat. The heat may be transferred to the reversible hydrogen storage material included in the first storage 1, thereby releasing hydrogen from the reversible hydrogen storage material. This operational sequence is merely an example, and the present disclosure is not limited thereto.

The non-reversible solid-state hydrogen storage material may be a hydrogen storage material that is operated in an operational temperature range of −40 to 100° C. and has a weight storage capacity of 5 wt % or more with respect to a total of material weight when hydrogen is released by a hydrolysis reaction. In this case, a mole heating value caused by the hydrolysis reaction may be higher than a mole amount of heat absorption caused by the hydrogen release of the reversible solid-state hydrogen storage material, thereby facilitating efficient heat supply. Detailed examples thereof may include a complex metal hydride, a chemical hydride, and a complex material obtained by combining two or more kinds thereof.

For example, the non-reversible solid-state hydrogen storage material may be $M^1BH_4$, $M^2(BH_4)_2$, $M^3(BH_4)_3$, $AlH_3$, $NH_3BH_3$, $NH_4B_3H_8$, $NH_2B_2H_5$, $NaBP_2H_8$, or a combination thereof. However, the non-reversible solid-state hydrogen storage material may be any material having the aforementioned characteristics without being limited thereto.

($M^1$ indicates Li, Na, or K, $M^2$ indicates Mg or Ca, and $M^3$ indicates Al or Ti.)

For example, the non-reversible solid-state hydrogen storage material may be $NaBH_4$, $NH_3BH_3$, or a combination thereof.

The non-reversible solid-state hydrogen storage material may be a hydrogen storage material operated in an operational temperature range of −40 to 100° C. and has a weight storage capacity of 2 wt % or more with respect to a total material weight. Detailed examples thereof may include a complex metal hydride, a metal hydride, a hydrogen storage alloy, and a complex material obtained by combining two kinds or more thereof.

For example, the reversible solid-state hydrogen storage material may be $M^4AlH_4$, $M^5(AlH_4)_2$, $M^6NH_2$, $M^7(NH_2)_2$, $Li_2NH$, $MgNH$, lithium-magnesium amide, lithium-magnesium imide, $M^8H$, $M^9H_2$, a Ti—Cr—V alloy, TiFe, Pd-$M^{10}$, Li-$M^{11}$, a Mg—Co alloy, a La—Ni alloy, or a combination thereof. However, the reversible solid-state hydrogen storage material may be any material having the aforementioned characteristics without being limited thereto.

($M^4$ indicates Li, Na, or Al, $M^5$ indicates Mg or Ca, $M^6$ indicates Li or Na, $M^7$ indicates Mg or Ca, $M^8$ indicates Li, Na, K, Rb, or Cs, $M^9$ indicates Mg, Ca, Sc, Ti, or V, $M^{10}$ indicates Ba, Y, or La, and $M^{11}$ indicates Ti, V, Zr, Nb, or Hf.)

For example, the reversible solid-state hydrogen storage material may be $NaAlH_4$ or a complex material containing $Mg(NH_2)_2$ and $LiH$.

A content of the non-reversible solid-state hydrogen storage material may be in a range of more than 0 wt % to 33.2 wt % with respect to a total of 100 wt % of the reversible solid-state hydrogen storage material and the non-reversible solid-state hydrogen storage material. When the non-reversible solid-state hydrogen storage material exists, heat and hydrogen released in the hydrolysis reaction thereof may be used. If the content of the non-reversible solid-state hydrogen storage material is too high, the heat release amount becomes larger than a total heat quantity required for the device. Accordingly, cooling may be needed, thereby reducing the heat efficiency.

Figure 3:
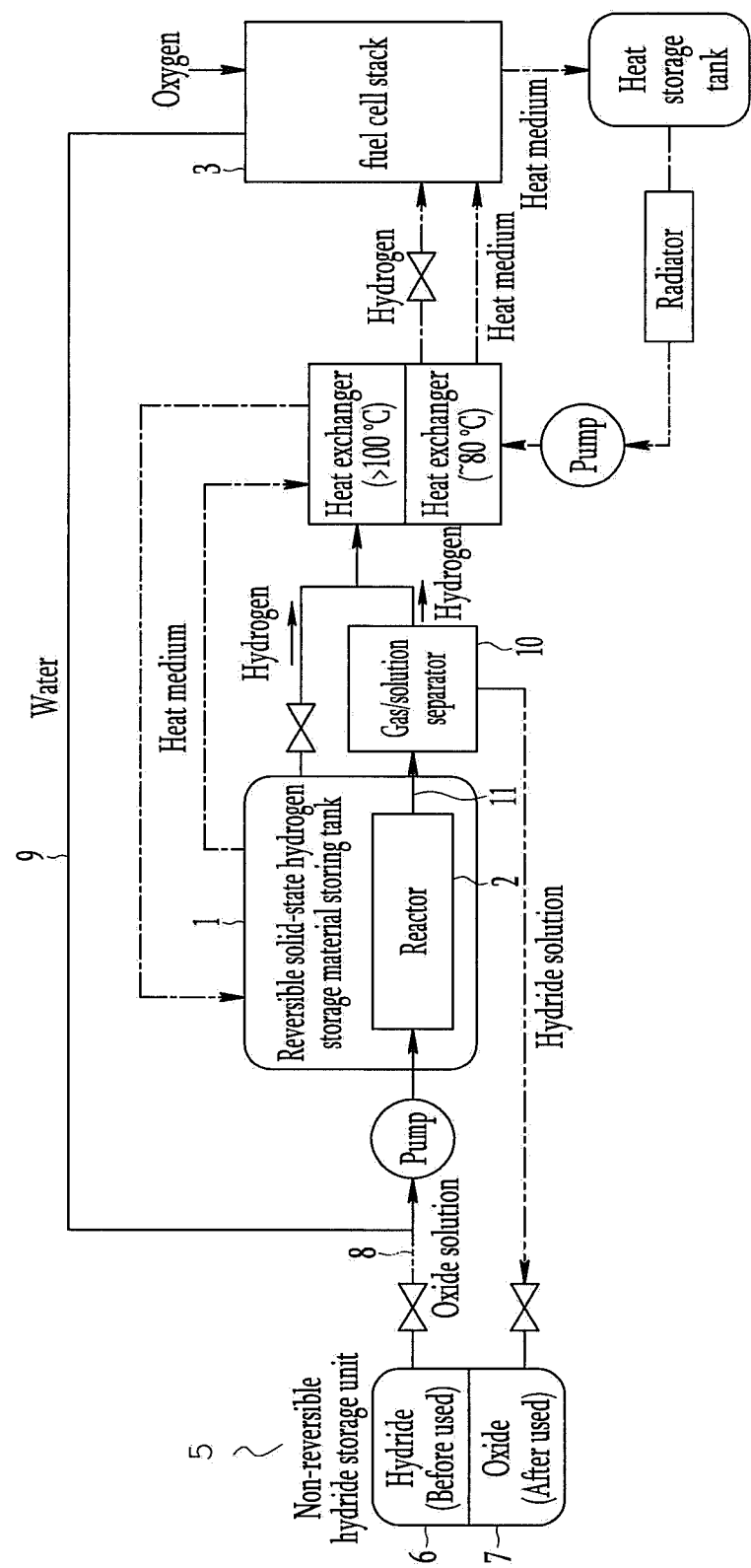
FIG. 3 is a schematic view illustrating a solid-state hydrogen storage device according to another exemplary embodiment of the present disclosure.
Figure 4:
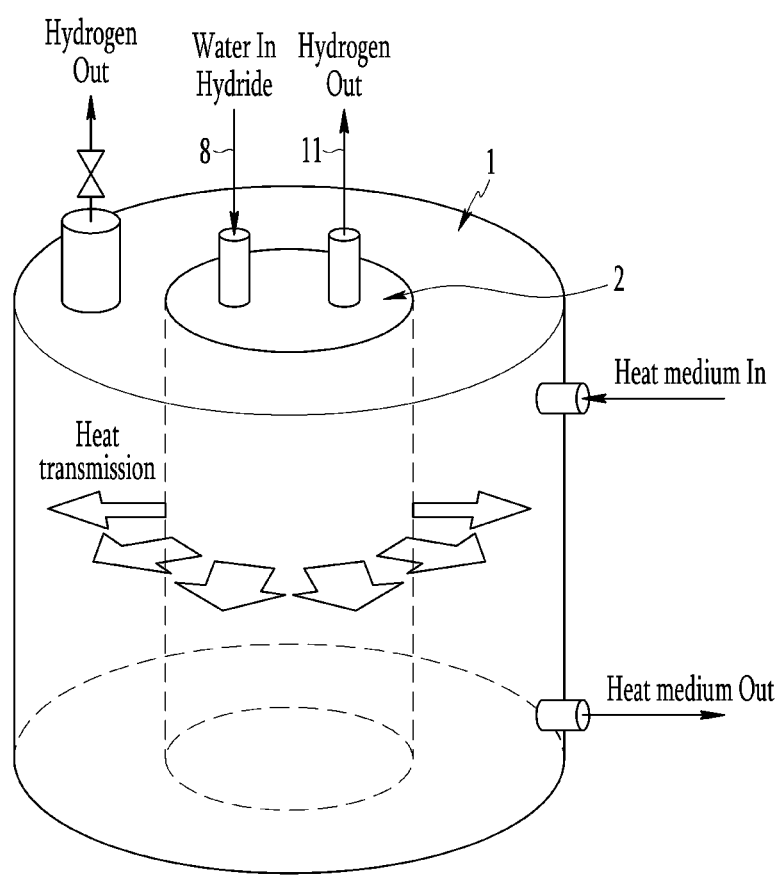
FIG. 4 is a schematic view illustrating a hydrogen storage unit in a solid-state hydrogen storage device according to the other exemplary embodiment of the present disclosure.
Figure 5:
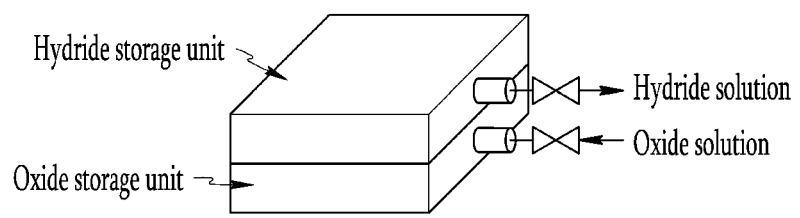
FIG. 5 is a schematic view illustrating a non-reversible solid-state hydrogen storage material storage unit according to the conventional art.
Figure 6:
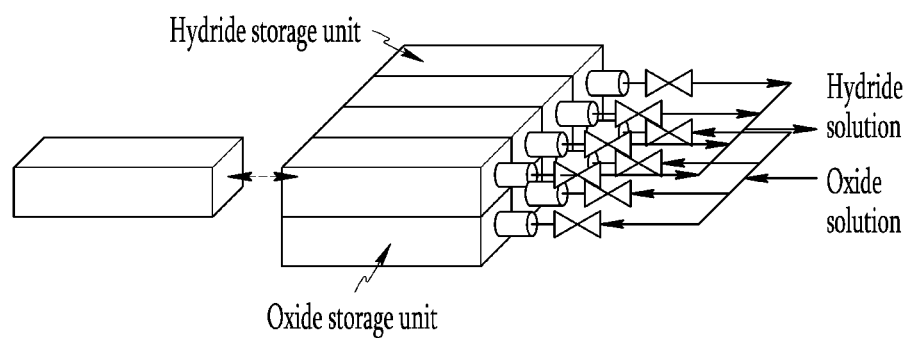
FIG. 6 is a schematic view illustrating a non-reversible solid-state hydrogen storage material storage unit according to an exemplary embodiment of the present disclosure.

FIG. 3 is a schematic view illustrating a solid-state hydrogen storage device according to another exemplary embodiment of the present disclosure. FIG. 4 is a schematic view illustrating a hydrogen storage unit in the solid-state hydrogen storage device according to the other exemplary embodiment of the present disclosure. FIG. 5 is a schematic view illustrating a non-reversible solid-state hydrogen storage material storage unit according to a conventional art. FIG. 6 is a schematic view illustrating a non-reversible solid-state hydrogen storage material storage unit according to an exemplary embodiment of the present disclosure. The solid-state hydrogen storage device according to the present exemplary embodiment will now be described with reference to FIG. 3 to FIG. 6.

According to a present exemplary embodiment, the solid-state hydrogen storage device may include a first storage 1 configured to store a reversible solid-state hydrogen storage material; a reactor 2 disposed in the first storage to enable a hydrolysis reaction of a non-reversible solid-state hydrogen storage material to be performed therein; a fuel cell stack 3; and a second storage unit 5 configured to store the non-reversible solid-state hydrogen storage material therein and connected to the reactor.

However, in the first storage 1 and the second storage unit 5, other materials may be stored in addition to the reversible solid-state hydrogen storage material and the non-reversible solid-state hydrogen storage material.

In this solid-state hydrogen storage device, no non-reversible solid-state hydrogen storage material is stored in the reactor 2, differently from the solid-state hydrogen storage device according to the aforementioned exemplary embodiment of the present disclosure. With such a configuration, it is possible to separate the reversible hydrogen storage material and a storage space from each other by exclusively including a hydrolysis reactor of the non-reversible material in a storage unit of the reversible hydrogen storage material, thereby improving replacement convenience. Further, it is possible to facilitate a system efficiency improvement and effective control by using both of heat and hydrogen released in the hydrolysis reaction of the non-reversible hydrogen storage material.

The second storage unit 5 may include a first unit-storage unit 6 configured to store the non-reversible solid-state hydrogen storage material, and a second unit-storage unit 7 configured to store an oxide generated after the hydrolysis reaction of the non-reversible solid-state hydrogen storage material.

Herein, as shown in FIG. 6 each of the first unit-storage unit 6 and the second unit-storage unit 7 may include two or more unit-storage units, which can be individually replaced.

FIG. 5 is a schematic view illustrating a non-reversible solid-state hydrogen storage material storage unit according to a conventional art. In the conventional non-reversible solid-state hydrogen storage material storage unit shown in FIG. 5, it may be required to replace all of a non-reversible material when hydrogen is re-charged. Accordingly, it may be difficult to apply such a non-reversible hydrogen storage material to a vehicle.

FIG. 6 is a schematic view illustrating a non-reversible solid-state hydrogen storage material storage unit according to an exemplary embodiment of the present disclosure, and a storage unit of the non-reversible solid-state hydrogen storage material may be formed to have an ink-cartridge form including a plurality of unit-storage units. Accordingly, a content that is enough to easily replace the non-reversible material may be included in each unit-storage unit by adjusting a weight ratio of the reversible solid-state hydrogen storage material and the non-reversible high-capacity material, thereby facilitating the replacement. As a result, the weight storage efficiency, the heat efficiency, and the replacement convenience of the device may be improved. Accordingly, it is possible to use a solid-state hydrogen storage device that is advantageous for vehicle loading.

According to another exemplary embodiment of the present disclosure, the solid-state hydrogen storage device may further include a first supply pipe 8 configured to have a first side connected to each of the first unit-storage units 6 and a second side connected to the reactor 2, to supply the non-reversible solid-state hydrogen storage material to the reactor 2. The solid-state hydrogen storage device may further include a second supply pipe 9 configured to have a first side connected to the first supply pipe 8 and a second side connected to the fuel cell stack 3, to supply water to the first supply pipe 8. The solid-state hydrogen storage device may further include a gas/solution separator 10 connected to the reactor 2 to separate hydrogen gas and an oxide generated in the hydrolysis reaction of the non-reversible solid-state hydrogen storage material included in the reactor 2. In addition, the solid-state hydrogen storage device may further include a third supply pipe 11 configured to have a first side connected to the reactor 2 and a second side connected to the gas/solution separator 10, to supply the hydrogen gas and the oxide generated in the hydrolysis reaction of the non-reversible solid-state hydrogen storage material included in the reactor 2 to the gas/solution separator 10. Further, the solid-state hydrogen storage device may also include a fourth supply pipe 12 configured to have a first side connected to the gas/solution separator 10 and a second side connected to the second unit-storage unit 7, to supply the oxide from the gas/solution separator 10 to the second unit-storage unit 7.

The non-reversible solid-state hydrogen storage material may serve to release heat during the hydrolysis.

As described above, a metal hydride which can be used as a hydrogen fuel source is excellent in reversibility of a hydrogen release and storage reaction. However, the metal hydride is operated at a high temperature of about 100° C. and needs a continuous heat supply for the hydrogen release. These problems have become the biggest obstacle to the practical use thereof.

In the solid-state hydrogen storage device according to a present exemplary embodiment, heat generated in the hydrolysis reaction of the non-reversible solid-state hydrogen storage material included in the reactor can be directly transferred to a storage unit configured to store a reversible hydrogen storage material. Accordingly, when a vehicle is initially started, the storage unit in which a metal hydride is stored can be quickly heated, thereby improving starting performance. Further, it is possible to reduce a quantity of heat consumption of a heat exchanger by using heat generated in the hydrolysis of the non-reversible hydrogen storage material, thereby improving the heat efficiency.

As a result, the weight storage efficiency, the heat efficiency, and the replacement convenience of the device may be improved. Accordingly, it is possible to provide a solid-state hydrogen storage device that is advantageous for vehicle loading.

An operational sequence including the hydrolysis reaction of the non-reversible hydride according to an exemplary embodiment of the present disclosure may be as follows. First, the non-reversible hydrogen storage material may be stored in the second storage unit 5 in a single state or in a solution state together with an appropriate solvent. However, the non-reversible hydrogen storage material may be stored in various appropriate forms to accomplish the objects of the present disclosure without being limited thereto. A catalyst may be stored in the reactor 2 to facilitate the hydrolysis reaction of the non-reversible solid-state hydrogen storage material.

The non-reversible hydrogen storage material stored in the first unit-storage unit 6 of the second storage unit 5 may be supplied to the first supply pipe 8. In this case, in the first supply pipe 8, the non-reversible hydrogen storage material may be mixed with water supplied from the second supply pipe 9. Then, the mixture may be supplied to the reactor 2 through the first supply pipe 8, and contact the catalyst included in the reactor 2. As a result, the hydrolysis reaction may be performed, thereby releasing heat. This heat may be transferred to the reversible hydrogen storage material, and thus hydrogen may be released from the reversible hydrogen storage material. Then, hydrogen gas and an oxide, or an oxide solution generated after the hydrolysis reaction, may be transferred to the gas/solution separator 10 through the third supply pipe 11. Herein, the hydrogen gas and the oxide may be separated from each other, and the hydrogen gas may be supplied to the fuel cell stack 3 through an additional pipe. A material such as an oxide solution including the oxide may be transferred to the storage unit 5 included in the second unit-storage unit 7 through the fourth supply pipe 12.

Herein, each of the first unit-storage unit 6 and second unit-storage unit 7 may be divided into a plurality of unit-storage units for easy replacement. For example, if all the non-reversible hydrogen storage material included in the first unit-storage unit 6 is supplied, the light-weight unit-storage units may be removed and replaced one by one. Further, if the oxide is fully filled in the second unit-storage unit 7, the unit-storage units may be removed and replaced one by one. In addition, easy replacement can be made in a charging time of hydrogen in a main metal hydride tank of the first storage 1.

This operational sequence is merely an example, and the present disclosure is not limited thereto.

The non-reversible solid-state hydrogen storage material may be a hydrogen storage material that is operated in an operational temperature range of −40 to 100° C. and has a weight storage capacity of 5 wt % or more with respect to a total material weight when hydrogen is released by a hydrolysis reaction. In this case, a mole heating value caused by the hydrolysis reaction may be higher than a mole amount of heat absorption caused by the hydrogen release of the reversible solid-state hydrogen storage material, thereby facilitating efficient heat supply. Detailed examples thereof may include a complex metal hydride, a chemical hydride, and a complex material obtained by combining two or more kinds thereof.

For example, the non-reversible solid-state hydrogen storage material may be $M^1BH_4$, $M^2(BH_4)_2$, $M^3(BH_4)_3$, $AlH_3$, $NH_3BH_3$, $NH_4B_3H_8$, $NH_2B_2H_5$, $NaBP_2H_8$, or a combination thereof. However, the non-reversible solid-state hydrogen storage material may be any material having the aforementioned characteristics without being limited thereto.

($M^1$ indicates Li, Na, or K, $M^2$ indicates Mg or Ca, and $M^3$ indicates Al or Ti.)

For example, the non-reversible solid-state hydrogen storage material may be $NaBH_4$, $NH_3BH_3$, or a combination thereof.

The non-reversible solid-state hydrogen storage material may be a hydrogen storage material that is operated in an operational temperature range of −40 to 100° C. and has a weight storage capacity of 2 wt % or more with respect to a total material weight. Detailed examples thereof may include a complex metal hydride, a metal hydride, a hydrogen storage alloy, and a complex material obtained by combining two or more kinds thereof.

For example, the reversible solid-state hydrogen storage material may be $M^4AlH_4$, $M^5(AlH_4)_2$, $M^6NH_2$, $M^7(NH_2)_2$, $Li_2NH$, $MgNH$, lithium-magnesium amide, lithium-magnesium imide, $M^8H$, $M^9H_2$, a Ti—Cr—V alloy, TiFe, Pd-$M^{10}$, Li-$M^{11}$, a Mg—Co alloy, a La—Ni alloy, or a combination thereof. However, the reversible solid-state hydrogen storage material may be any material having the aforementioned characteristics without being limited thereto.

($M^4$ indicates Li, Na, or Al, $M^5$ indicates Mg or Ca, $M^6$ indicates Li or Na, $M^7$ indicates Mg or Ca, $M^8$ indicates Li, Na, K, Rb, or Cs, $M^9$ indicates Mg, Ca, Sc, Ti, or V, $M^{10}$ indicates Ba, Y, or La, and $M^{11}$ indicates Ti, V, Zr, Nb, or Hf.)

For example, the reversible solid-state hydrogen storage material may be $NaAlH_4$ or a complex material containing $Mg(NH_2)_2$ and LiH.

A content of the non-reversible solid-state hydrogen storage material may be in a range of more than 0 wt % to 33.2 wt % with respect to a total of 100 wt % of the reversible solid-state hydrogen storage material and the non-reversible solid-state hydrogen storage material. When the non-reversible solid-state hydrogen storage material exists, heat and hydrogen released in, or during, the hydrolysis reaction thereof may be used. If the content of the non-reversible solid-state hydrogen storage material is too high, the heat release amount may become larger than total heat quantities required for the device. Accordingly, cooling may be needed, thereby reducing the heat efficiency.

The following examples illustrate the present disclosure in more detail. However, the following examples are merely exemplary examples, and the present disclosure is not limited thereto.

EXAMPLES $NaAlH_4$ was employed as a reversible hydrogen storage material, and $NaBH_4$ was employed as a non-reversible hydrogen storage material. As shown in Table 1, it can be seen that weight storage efficiency is significantly improved by using the reversible hydrogen storage material and the high-capacity non-reversible hydrogen storage material together. Further, it can be seen that since heat quantities generated in the hydrolysis of the non-reversible hydrogen storage material, when hydrogen is released at 2 g/s in the reversible hydrogen storage material, heat quantities that are additionally required are significantly reduced.

However, when the non-reversible hydrogen storage material exceeds 33.2 wt % with respect to a total of 100 wt %, a heating value as a result of the hydrolysis was larger than that required for hydrogen release. Accordingly, cooling was additionally required.

TABLE 1

| Hydrogen 2 kg Solid-state hydrogen storage tank System configuration* | $NaAlH_4$ (kg) ** | $NaBH_4$ (kg) *** | Storage vessel (kg) | Hydrogen (kg) | Weight storage efficiency (wt. %) | Heat quantity (kW) **** Required when 2 g/s hydrogen is released | |
|---|---|---|---|---|---|---|---|
| Comparative Example [$NaAlH_4$ 100%] | 40 | 0 | 20 | 2 | 3.3 | — | 37 | — |
| Example 1 [$NaAlH_4$ 80%/$NaBH_4$ 20%] | 32 | 8 | 20 | 2.4 | 4 | 20% ↑ | 15 | 60% ↓ |
| Example 2 [$NaAlH_4$ 70%/$NaBH_4$ 30%] | 28 | 12 | 20 | 2.6 | 4.3 | 30% ↑ | 3.6 | 90% ↓ |
| Example 3 [$NaAlH_4$ 66.8%/$NaBH_4$ 33.2%] | 26.7 | 13.3 | 20 | 2.66 | 4.4 | 33.3% ↑ | 0 | — |

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A solid-state hydrogen storage device comprising:
a first storage configured to store a reversible solid-state hydrogen storage material and to generate hydrogen gas by a heat absorbing reaction of the reversible solid-state hydrogen storage material;
a second storage configured to store a non-reversible solid-state hydrogen storage material therein;
a reactor disposed in the first storage and connected with the second storage, wherein the reactor is configured to generate heat by a hydrolysis reaction of the non-reversible solid-state hydrogen storage material and to transfer the heat to the first storage enclosing the reactor; and
a fuel cell stack connected to the first storage and the reactor, wherein the fuel stack is configured to receive hydrogen gas,
wherein the second storage is disposed separately from the first storage, and connected to the reactor through the first storage,
wherein the non-reversible solid-state hydrogen storage material is $M^1BH_4$, $M^2(BH_4)_2$, $M^3(BH_4)_3$, $AlH_3$, $NH_3BH_3$, $NH_4B_3H_8$, $NH_2B_2H_5$, $NaBP_2H_8$ or a combination thereof,
wherein $M^1$ indicates Li, Na, or K, $M^2$ indicates Mg or Ca, and $M^3$ indicates Al or Ti,
wherein the second storage includes:
a first unit-storage configured to store the non-reversible solid-state hydrogen storage material; and
a second unit-storage configured to store an oxide generated after the hydrolysis reaction of the non-reversible solid-state hydrogen storage material,
wherein each of the first unit-storage and the second unit-storage is individually replaceable, and
wherein the solid-state hydrogen storage device further comprises an oxide supply pipe connected to the second unit-storage, the oxide supply pipe configured to supply the oxide generated by the hydrolysis reaction in the reactor to the second unit-storage.

2. The solid-state hydrogen storage device of claim 1, wherein each of the first unit-storage and the second unit-storage includes two or more first unit-storages.

3. The solid-state hydrogen storage device of claim 2, further comprising a first supply pipe having a first side connected to each of the first unit-storage units and a second side connected to the reactor, the first supply pipe configured to supply the non-reversible solid-state hydrogen storage material to the reactor.

4. The solid-state hydrogen storage device of claim 3, further comprising a second supply pipe having a first side connected to the first supply pipe and a second side connected to the fuel cell stack, the second supply pipe configured to supply water to the first supply pipe.

5. The solid-state hydrogen storage device of claim 4, further comprising a gas/solution separator connected to the reactor to separate hydrogen gas and an oxide generated in the hydrolysis reaction of the non-reversible solid-state hydrogen storage material included in the reactor.

6. The solid-state hydrogen storage device of claim 5, further comprising a third supply pipe having a first side connected to the reactor and a second side connected to the gas/solution separator, the third supply pipe configured to supply hydrogen gas and the oxide generated in the hydrolysis reaction of the non-reversible solid-state hydrogen storage material included in the reactor to the gas/solution separator.

7. The solid-state hydrogen storage device of claim 6, wherein the oxide supply pipe has a first side connected to the gas/solution separator and a second side connected to the second unit-storage.

8. The solid-state hydrogen storage device of claim 1, wherein the non-reversible solid-state hydrogen storage material is $NaBH_4$, $NH_3BH_3$ or a combination thereof.

9. The solid-state hydrogen storage device of claim 1, wherein the reversible solid-state hydrogen storage material is $M^4AlH_4$, $M^5(AlH_4)_2$, $M^6NH_2$, $M^7(NH_2)_2$, $Li_2NH$, MgNH, lithium-magnesium amide, lithium-magnesium imide, $M^8H$, $M^9H_2$, a Ti—Cr—V alloy, TiFe, Pd-$M^{10}$, Li-$M^{11}$, a Mg—Co alloy, a La—Ni alloy or a combination thereof, and
wherein $M^4$ indicates Li, Na, or Al, $M^5$ indicates Mg or Ca, $M^6$ indicates Li or Na, $M^7$ indicates Mg or Ca, $M^8$ indicates Li, Na, K, Rb, or Cs, $M^9$ indicates Mg, Ca, Sc, Ti, or V, $M^{10}$ indicates Ba, Y, or La and $M^{11}$ indicates Ti, V, Zr, Nb, or Hf.

10. The solid-state hydrogen storage device of claim 9, wherein the reversible solid-state hydrogen storage material is $NaAlH_4$ or a complex material containing $Mg(NH_2)_2$ and LiH.

11. The solid-state hydrogen storage device of claim 1, wherein a content of the non-reversible solid-state hydrogen storage material is in a range of more than 0 wt % to 33.2 wt % with respect to a total of 100 wt % of the reversible solid-state hydrogen storage material and the non-reversible solid-state hydrogen storage material.

* * * * *